United States Patent
Yahya

(10) Patent No.: US 8,532,162 B2
(45) Date of Patent: Sep. 10, 2013

(54) TRANSCEIVER FRONT END FOR SOFTWARE RADIO SYSTEM

(75) Inventor: Mazlaini Yahya, Selangor Darul Ehsan (MY)

(73) Assignee: Telekom Malaysia Berhad, Kuala Lumpur (MY)

( * ) Notice: Subject to any disclaimer, the term of this patent is extended or adjusted under 35 U.S.C. 154(b) by 838 days.

(21) Appl. No.: 12/450,953

(22) PCT Filed: Apr. 25, 2007

(86) PCT No.: PCT/MY2007/000026
§ 371 (c)(1),
(2), (4) Date: Oct. 20, 2008

(87) PCT Pub. No.: WO2008/133489
PCT Pub. Date: Nov. 6, 2008

(65) Prior Publication Data
US 2010/0124257 A1    May 20, 2010

(51) Int. Cl.
*H04B 1/38*   (2006.01)
(52) U.S. Cl.
USPC ......................................................... 375/219
(58) Field of Classification Search
USPC .......................................... 375/219, 295, 316
See application file for complete search history.

(56) References Cited

U.S. PATENT DOCUMENTS

| | | | |
|---|---|---|---|
| 6,141,372 A | 10/2000 | Chalmers | |
| 2005/0031046 A1* | 2/2005 | Al-Adani | 375/260 |
| 2005/0032480 A1* | 2/2005 | Lee et al. | 455/76 |
| 2005/0058230 A1* | 3/2005 | Thomas et al. | 375/347 |
| 2007/0047673 A1* | 3/2007 | Xu et al. | 375/332 |

OTHER PUBLICATIONS

International Search Report dated Feb. 13, 2008.

* cited by examiner

*Primary Examiner* — Kevin M Burd
(74) *Attorney, Agent, or Firm* — Jacobson Holman PLLC

(57) ABSTRACT

A digital front end transceiver system (300) for a software radio system comprising: a transmitter module (310) adapted to digitally interpolate, up-convert and combine baseband digital in-phase (I) and quadrature (Q) channels to form a digital intermediate frequency (IF) IQ signal for conversion to an analogue IF IQ signal for transmission; and a receiver module (320) adapted to separate, down-convert and decimate a received digital IF IQ signal into baseband digital I and Q channels. The transmitter and receiver modules use a common fixed sampling and IF conversion rate $f_s$, where $f_s$ is a quadruple of the bandwidth of the baseband signal, such that the system can be applied in a software radio system for a wireless communication application having any baseband bandwidth by selecting the fixed sampling rate based on the baseband bandwidth.

7 Claims, 6 Drawing Sheets

TRANSCEIVER FRONT END FOR SOFTWARE RADIO SYSTEM

This is a national stage of PCT/MY07/000,026 filed Apr. 25, 2007 and published in English, hereby incorporated by reference.

FIELD OF THE INVENTION

The field of the invention is radio transceivers, and in particular the front end systems used in transceivers for software radio systems. An example of an application of the present invention is a front end for a wireless communication system transceiver.

BACKGROUND OF THE INVENTION

The popularity of mobile wireless communications has resulted in the development and use of many new and different wireless communication specifications, techniques and standards. Examples of some current standards are: time division multiple access (TDMA), code division multiple access (CDMA), orthogonal frequency division multiplexing (OFDM) and orthogonal frequency division multiple access (OFDMA). The various wireless communication standards enable simultaneous operation of multiple wireless communication sessions involving voice communications, data communications or any type of digital payload.

The many different communication standards operating at different radio frequencies and bandwidths typically require transceiver architecture to be developed specifically for different communication standards. Thus each system will use different hardware architecture.

There are developments to try to overcome the problem of dedicated hardware architecture for current and future wireless systems by using software radio, where the radio frequencies and bandwidths can be modified through software changes on the same hardware. Software radio systems aim to process waveforms as sampled digital signals using software as much as possible, rather than requiring specialised analogue hardware for each processing function. With improvements in processor capacity, functions that are traditionally performed by hardware can be implemented in software.

Current software radio implementations utilise parameterized digital functions such as digital signal mixers, filters, interpolators and decimators that allow signals having a high carrier frequency transmitted over the air to be converted into baseband signals for digital signal processing for the various wireless communication techniques such as TDMA, CDMA, OFDM or OFDMA.

All the above wireless communication techniques maximize transmission over the air through quadrature modulation, where two transmission channels separated by a 90° phase shift are provided, in-phase and quadrature channels (IQ channels). Signals or data transmitted over the two IQ channels are combined before further transmission at higher frequency. The advantage of IQ channels is that two different sampled signals or data can be transmitted sequentially and almost simultaneously over single higher frequency channel by taking advantage the periodicity of oscillated signal through cosine oscillation which can be phase separated perfectly and naturally by 90° through sine oscillation as illustrated in FIG. 1.

The most common method in broadband digital communication system is to convert a signal in the Radio Frequency (RF) or Intermediate Frequency (IF) in a channel from and to the baseband signal directly, illustrated in FIG. 1, where the signal center of frequency is at 0 Hz allowing efficient digital signal processing algorithms to be applied for signal correction and recovery before proceeding to higher layer of communication level. The analogue transmitter circuit in FIG. 1 converts the signal from baseband to higher frequency in stages until it reaches the desired transmission frequency at the transmit antenna 9. The inverse operation is performed for the analogue receiver circuit 10 that converts RF and IF signals starting from the frequency received at the antenna 19 in stages until it reaches the baseband.

Imperfections in analogue circuit implementations specific to the quadrature mixer, produce offsets and errors in the frequency mixers 2 and 11 and the oscillators 3 and 12. For example, these components are commonly influenced by high circuit temperature, thermal noise, and implementation flaws from design and materials used. The offsets and errors generated from the mixers and the oscillators affect the quality of the combined modulated signal from in-phase (I) and quadrature (Q) signal paths as shown in Equation 1 for the transmit mixer output 8, Equation 2 for the receive mixer output 13 and Equation 3 for the receiver mixer output 14. Where $x_I$ is the signal for the I-path, $x_Q$ is the signal for Q-path, $\epsilon_T$ is the transmit gain error produced by the imperfect transmit mixer, $\epsilon_R$ is the receive gain error produced by the imperfect receive mixer, $\phi_T$ is the transmit oscillation phase offset produced by imperfect transmit oscillators and $\phi_R$ is the receive oscillation phase offset produced by imperfect receive oscillators.

$$Y_8 = (1+\epsilon_T)x_I \cos\phi_T + (1-\epsilon)x_Q \sin\phi_T \quad (1)$$

$$Y_{13} = (1+\epsilon_R)x_I \cos\phi_R + (1-\epsilon_R)x_Q \sin\phi_R \quad (2)$$

$$Y_{14} = (1+\epsilon_R)x_Q \cos\phi_R + (1-\epsilon_R)x_I \sin\phi_R \quad (3)$$

The imperfection of analogue circuitry produces imperfection of quadrate modulation which, in turn, results in radio frequency signal degradation such as amplitude, phase and frequency offsets to the signal.

A prior art approach to this problem is to implement quadrature modulation digitally through digital mixers, digital cosine and sine oscillation, perfect attenuation digital filters, interpolators and decimators to sample the digital signals correctly at different stages of the signal frequencies from high frequency to baseband and vice versa as illustrated in FIG. 2, which shows a typical digital front-end radio implementation currently used in commercial communication applications.

The errors and offsets of the analogue quadrature mixers can be eliminated through digital implementation as illustrated in FIG. 2 using digital IF sampling method. Implementation of this method provides the term digital front-end radio implementation. The digital transmit quadrature mixer 20 implements digital multiplication 21 as mixer, digital oscillator 22 or numerical control oscillator (NCO) that generates cosine and sine waveform digitally and a digital adder 23. This architecture uses single digital-to-analogue converter (DAC) 28 which is one of the architecture's main advantages. The digital receiver quadrature mixer 29 implements digital multiplication 30 as mixer and digital oscillator 31. Likewise, the receiver architecture uses single analogue-to-digital converter (ADC) 38.

In FIG. 2 the number of analogue-to-digital converters (ADC) and digital-to-analogue converter (DAC) can be reduced to single ADC and DAC but with higher design specification and tolerance requirements due to the high frequency digital sampling rate. The implementation of digital IF sampling module can be very costly due to the complexity of numerical controlled oscillator (NCO) which generates digital cosine and sine oscillation and operates at sampling frequency of multiple times of IF signal frequency. In addition, two stage filters have to be implemented i.e. one is for pulse shaping to smooth digital signals into a natural analogue signal representation form, and another for the interpolator or decimator which increase or decrease sampling rate respectively. Due to this complexity and high cost the use of digital front-end for software radio systems is only feasible for implementation on base stations and access points. The costs involved are prohibitive for providing digital font-end for software radio in terminal or subscriber stations.

SUMMARY OF THE INVENTION

According to aspects of the present invention there is provided a digital front end transceiver system for a software radio system comprising:

a transmitter module adapted to digitally interpolate, up-convert and combine baseband digital in-phase (I) and quadrature (Q) channels to form a digital intermediate frequency (IF) IQ signal for conversion to analogue IF IQ signal for transmission; and a receiver module adapted to separate, down-convert and decimate a received digital IF IQ signal into baseband digital I and Q channels, wherein the transmitter and receiver modules use a common fixed sampling and IF conversion rate $f_s$, where $f_s$ is a quadruple of the bandwidth of the baseband signal, such that the architecture can be applied in a software radio system for a wireless communication application having any baseband bandwidth by selecting the fixed sampling rate based on the baseband bandwidth.

Preferably the sampling rate fs=4BW where BW is the bandwidth of the baseband signal, such that the centre frequency $f_{IF}$ of the intermediate frequency signal IF is $f_{IF}$=BW The advantage of embodiments of the present invention is the same system can be applied in communication systems having different bandwidth requirements by varying the sampling frequency in accordance with the system bandwidth.

The invention also extends to a transceiver with the above system

The invention also provides a signal processing method of a software radio system comprising:

Producing a transmitter module (310) adapted to digitally interpolate, up-convert and combine baseband digital in-phase (I) and quadrature (Q) channels to form a digital intermediate frequency (IF) IQ signal for conversion to an analogue IF IQ signal for transmission; and providing a receiver module (320) adapted to separate, down-convert and decimate a received digital IF IQ signal into baseband digital I and Q channels, operating the transmitter and receiver modules with a common fixed sampling and IF conversion rate $f_s$, where $f_s$ is a quadruple of the bandwidth of the baseband signal by selecting the fixed sampling rate based on the baseband bandwidth.

BRIEF DESCRIPTION OF THE DRAWINGS

An embodiment, incorporating all aspects of the invention, will now be described by way of example only with reference to the accompanying drawings in which FIG. 1. is an example of a typical analogue front end architecture for a software radio transmitter and receiver.

DETAILED DESCRIPTION

The digital front end transceiver system of the present invention enables a common architecture to be used for communication systems using software radio by using a common fixed sampling rate and intermediate frequency conversion rate, $f_s$, for the transmitter and receiver front end components respectively, where $f_s$ is a quadruple of the bandwidth of the baseband signal.

Figure 1:
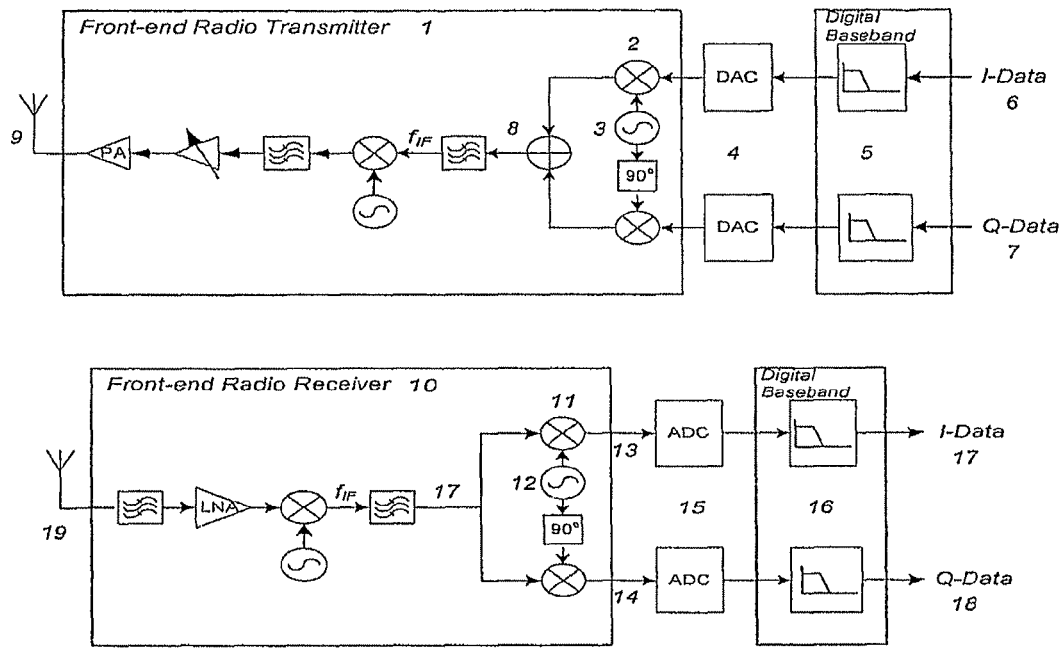
Figure 2:
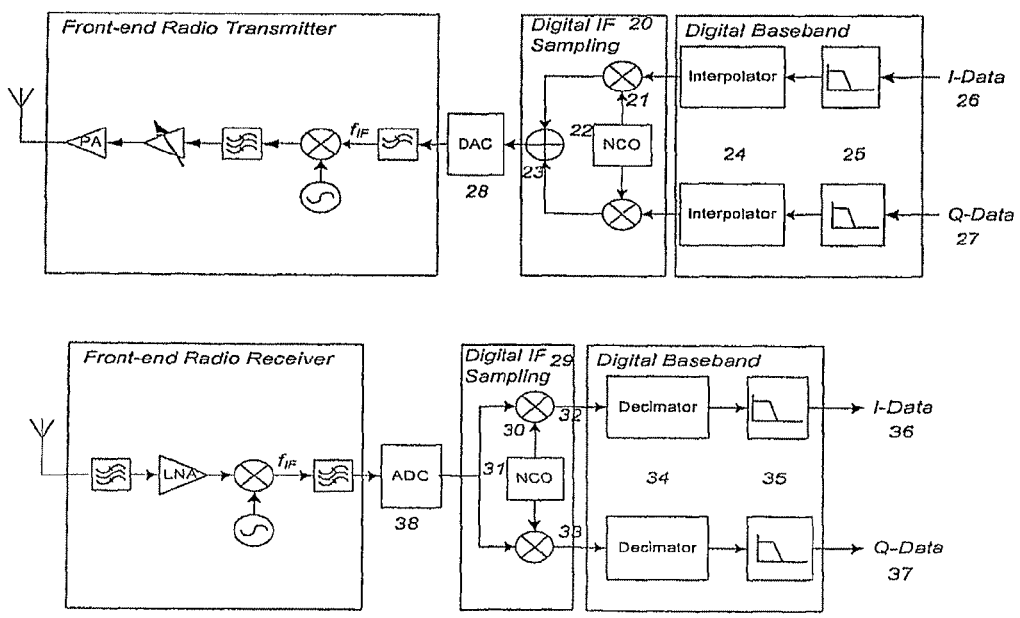
FIG. 2. is an example of a known digital front end architecture for a software radio transmitter and receiver.
Figure 3:
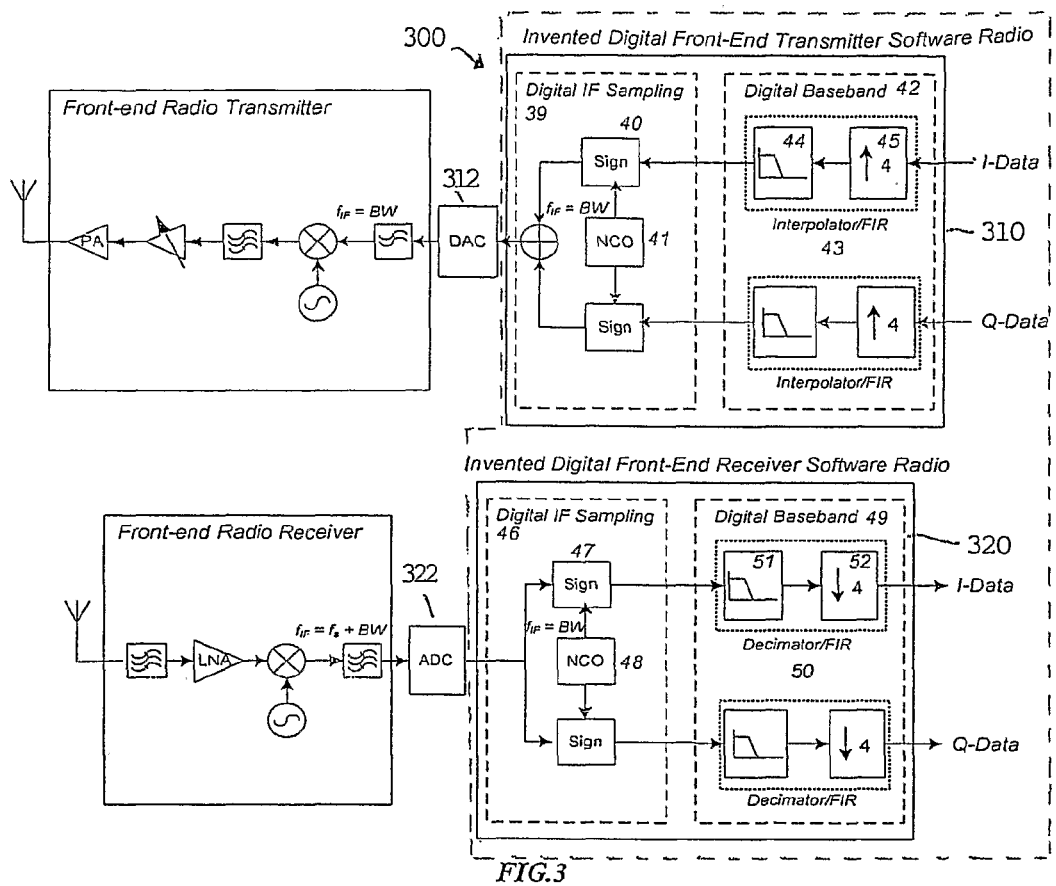
FIG. 3. illustrates an embodiment of the digital front end system for a software radio transmitter of the present invention.

An embodiment of the transceiver system is shown in FIG. 3. The digital front end system 300 comprises a transmitter module 310 and a receiver module 320. The transmitter module 310 comprises: digital transmitter baseband interpolator 42 and an up-converting digital intermediate frequency (IF) sampler/mixer 39. The transmitter module can also include a digital to analogue converter 312. The receiver module 320 comprises: a down-converting digital IF sampler/mixer 46; and a decimator 49. The receiver module can also include an analogue to digital converter (ADC) 322.

Embodiments of the system can be implemented for use with compatible ADCs or DACs, thus the ADC or DAC can be omitted in some realised hardware embodiments of the transceiver front end, such as an application specific integrated circuit (ASIC) or field programmable gate array (FPGA), where the ADC and DAC functionality are provided implemented in additional components.

The transmitter module 310 performs the functions of digitally up-converting the baseband I and Q channels to the intermediate frequency, mixing the up-converted I and Q channels to form a digital IF IQ signal. The digital transmitter baseband interpolator 42 includes for each of the I and Q channels: a digital sampler 45 and a low-pass filter (LPF) 44. The digital sampler 45 samples the symbols for transmission, having a low symbol rate equal to the baseband bandwidth BW, at a higher sampling rate ($f_s$). The low sampling rate is equal to the baseband bandwidth (BW) and in the preferred embodiment the higher sampling frequency ($f_s$) is equal to four times the baseband bandwidth (BW), thus $f_s$=4BW. The low-pass filter (LPF) 44 performs pulse-shaping and interpolation of the digitally sampled signal.

The digital intermediate frequency sampler/mixer 39 combines and up-converts the I and Q channels using two sign modifiers 40a and 40b and a numerically controlled oscillator (NCO) 41 and mixer 314 to provide a digital IQ signal up-converted to the intermediate frequency IF. The digital IQ signal is then converted to an analogue IQ signal for transmission by digital to analogue converter (DAC) 312.

The digital up-conversion technique employed by embodiments of the present invention uses a common sampling rate, $f_s$, to up-convert the baseband signal to an intermediate frequency (IF). The DAC 312 system clock operates at the same sampling frequency, $f_s$. In the preferred embodiment, the sampling frequency is four times the baseband bandwidth, $f_s=4BW$, and the centre frequency of the IF signal, $f_{IF}$, is equal to the baseband bandwidth, $f_{IF}=BW$.

Using the common sampling frequency, fs, as described above enables the up-converting digital intermediate frequency sampler/mixer 39 to be implemented using a multiplier-less architecture, which uses simple sign modifiers 40a and 40b to change the sign property of the signal into positive, zero and negative in a periodic manner. The sign is generated by a simple NCO that only generates 1 s, −1 s and 0 s in a periodic cycle.

The operation of the digital up-converter will now be explained in more detail with reference to FIGS. 4 and 5. The baseband signal 65 input to the up-converter 400 is sampled at a sampling frequency, $f_s$, which is 4 times BW, the samples 66 are then interpolated and pulse shaped using the LPF 61. The digital mixer 55 and the NCO 56 operate at $f_s$ which is 4 times $f_{IF}$. The NCO generates periodic +1, 0, −1 and 0 values for oscillation phase at 0°, 90°, 180° and 270°. The four phases represent the 4 times multiplicity of $f_s$ over $f_{IF}$. This enables the digital mixer to be multiplier-less as it involves sign multiplication of 0, 1 and −1 in which only value −1 requires to signal value to be negated. A non-integer multiplicity of $f_s$ over $f_{IF}$ results NCO generating values other than 0, 1 and −1 and requires fixed-point multiplication. Taking advantage of integer sampling multiplicity technique all sides of the baseband signal are up-converted where the intermediate frequency centre frequency $f_{IF}=BW$.

The NCO generates perfect oscillation of 1 s, −1 s and 0 s in periodic manner when the oscillation value is four times of the periodic frequency. Using the multiplicity of four, the operating sampling frequency can be fixed to four times the baseband bandwidth (4BW) to ensure the IF bandwidth falls outside the baseband 76 illustrated in FIG. 6. When the sampled baseband digital signal 54 is digitally mixed with digital oscillation 56 in the digital IF sampler 53 in FIG. 4, the baseband signal is up-converted to the IF ($f_{IF}=BW$) 75 to 76 illustrated in FIG. 5 by the mixing process.

Figure 5:
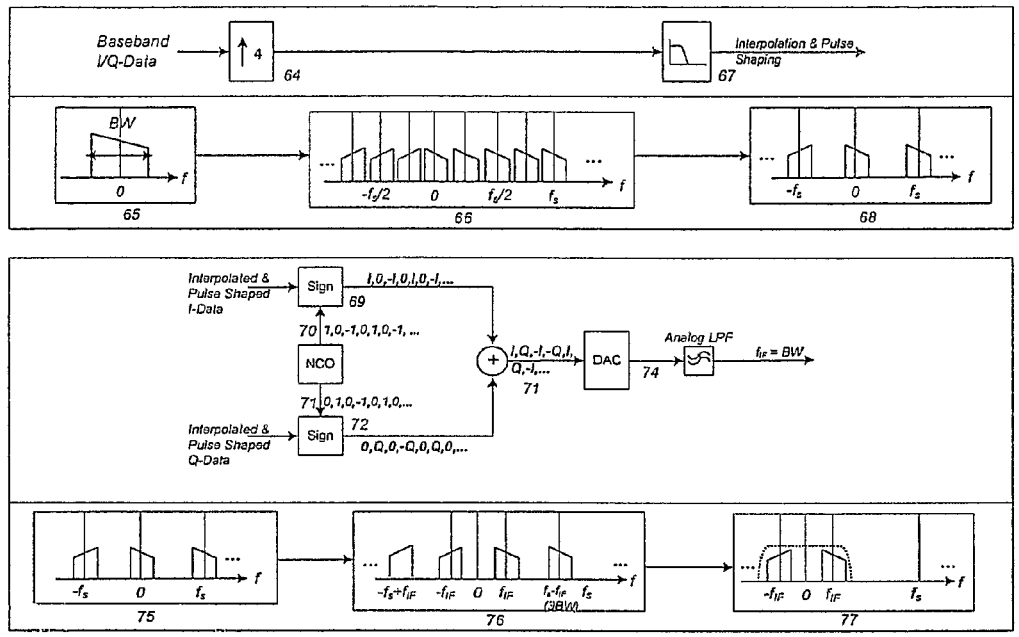
FIG. 5. illustrates components of the digital front end transmitter system with sampling results in frequency domain illustrated for each up-converter function.
Figure 6:
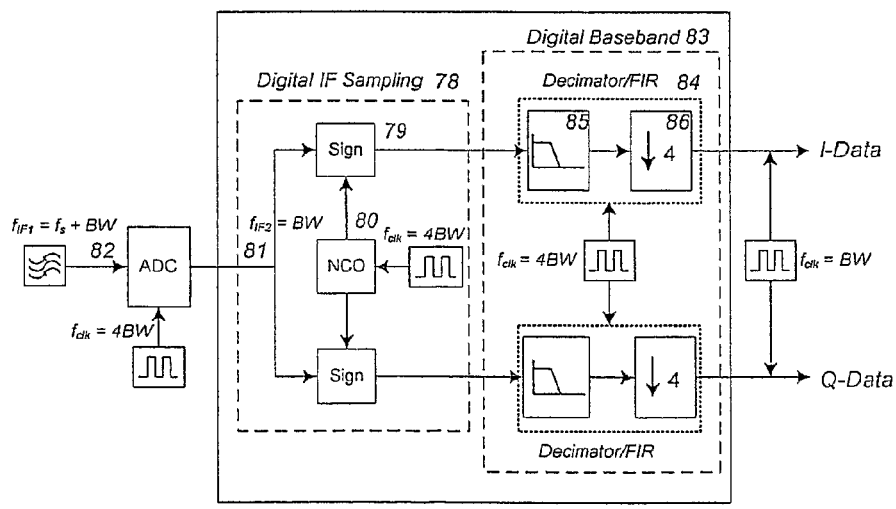
FIG. 6. is an embodiment of a digital front end receiver system according to an embodiment of the present invention.

The spectrum behavior of the digital up-conversion is illustrated in FIG. 5. The baseband signal 65 is sampled at four times the baseband sampling rate or bandwidth to enable the signal to be mixed digitally in the digital IF sampling stage. The baseband signal 65 is interpolated to four times its bandwidth 66 through the up-sample and interpolation filter 68. The interpolated signal 75 is digitally mixed by the digital mixer components 53 producing up-converted signal sequences for the I-path and the Q-path 76. The spectrum image produced by the mixer at $f_s$-$f_{IF}$, near sampling rate $f_s$, is filtered by an analogue LPF after the DAC 57 to remove the spectrum image 77 before further IF processing in the analogue domain.

The receiver module 320 down-converts the received IQ channel from the IF to the baseband, separates the received IQ channel signal into the respective I and Q components, and decimates of the respective I and Q channel signals. An ADC 322 converts the received analogue IQ signal to a digital IQ signal. A property of the analogue to digital conversion is utilised to naturally down-convert the signal from a first intermediate frequency (IF1) to a second intermediate frequency (IF2). The down-converting digital IF sampler/mixer 78 includes an NCO 80 and two sign converters 79a 79b for separating and digitally down-converting the I and Q channel symbols from the second intermediate frequency IF2 to a baseband signal. The I and Q channels are then each pulse shaped and decimated by the LPFs 51 and samplers 52 of the decimator 49 to provide baseband symbols of bandwidth BW for further processing.

Figure 4:
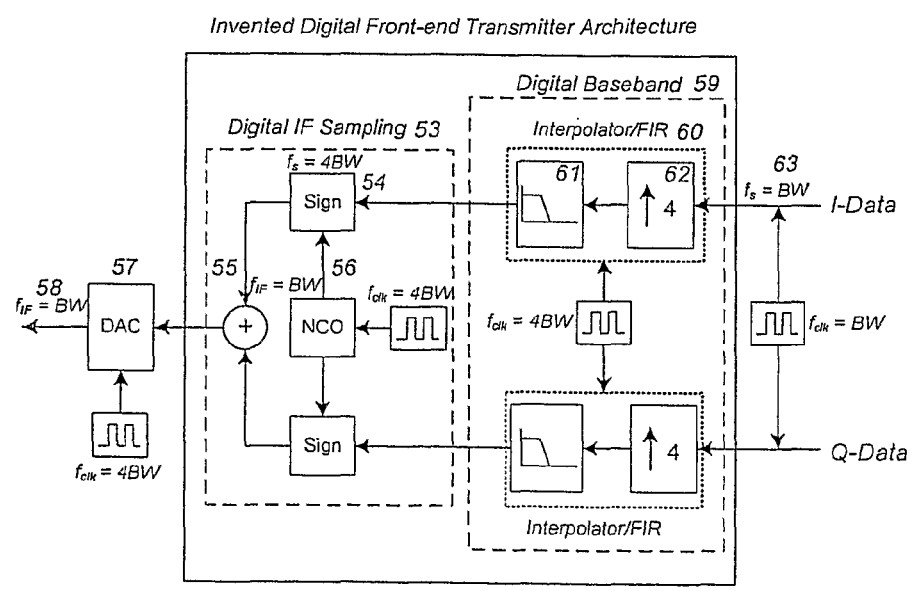
FIG. 4. is an embodiment of a digital front end transmitter system according to an embodiment of the present invention.

The digital front-end transmitter architecture in FIG. 4 has fixed digital clock frequency $f_{clk}$ for digital processing equal to 4BW from baseband to DAC. Likewise the digital front-end receiver architecture in FIG. 6 uses a digital clock frequency equal to 4BW.

Figure 7:
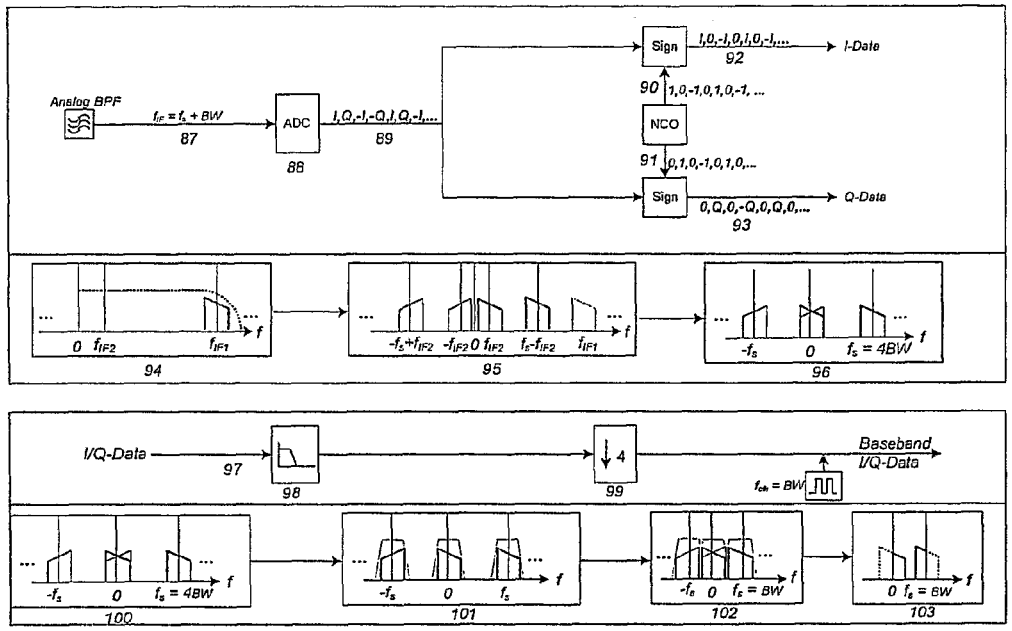
FIG. 7. illustrates components of the digital front end receiver system with sampling results in frequency domain illustrated for each down-converter function.

Embodiment of the invention take advantage of a property of digital IF sampling where the IF signal before the ADC has a centre frequency $f_{IF1}$ where $f_{IF1}=f_s+BW=4BW+BW=5BW$. When the IF signal is sampled at $f_s=4BW$, the IF signal naturally down-converts to a new IF precisely at BW. As illustrated in FIG. 7, when the signal from ADC 81 is digitally mixed with digital oscillation in the digital IF sampler 78 in FIG. 6, the IF signal 81 is down-converted 95 to 96 by the mixing process.

The spectrum behaviour of the digital down-conversion is illustrated in FIG. 7. The IF signal 87 94 before the ADC must be filtered by analog band-pass filter (BPF) 610 to remove any spectrum image and DC component resulted from analogue frequency mixing. The first IF signal 82 having a centre frequency $f_{IF1}$, where $f_{IF1}=f_s+BW$, is naturally down-converted to new a new centre frequency $f_{IF2}$, where $f_{IF2}=BW$, when the ADC signal 81 is sampled at a sampling rate $f_s$, where $f_s=4BW$. At new $f_{IF2}=BW$, the second IF signal 95 is sampled by the sampler/mixer 78 to separate the IQ channel into the respective I and Q components and further down-convert the signals to baseband signals having a bandwidth of $f_s=4BW$ which is subsequently digitally pulse-shaped 101 and decimation 101 is done to sample the signal from $f_s=4BW$ to the original baseband bandwidth and symbol rate for further baseband digital signal processing.

Figure 8:
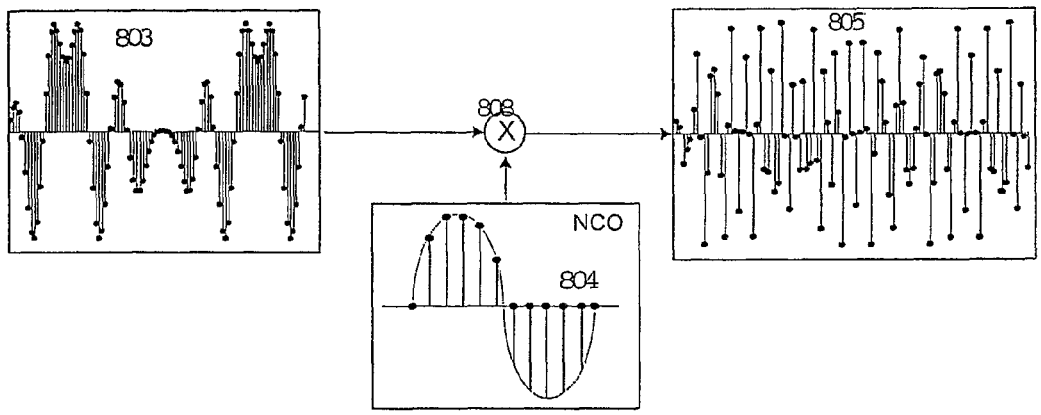
FIG. 8. illustrates an example of complex digital mixing.

An advantage of the system of the present invention is that it avoids complex signal multiplication. An example of common complex digital mixing used in commercial systems is illustrated in FIG. 8. The illustrated common complex digital mixer has a fixed-point multiplier 808 and digital cosine/sine generator 804. The $f_s$ must be in great multiples of BW to represent perfect oscillation. A Coordinate Rotation Digital Computer (CORDIC) algorithm is used to implement digital cosine and sine oscillation. This algorithm can be complex to process and produce slow throughput due to the number of cycles for the algorithm to rotate within angular unit circle before converging to desired oscillation value. Discrete signal sample result of the digital mixer is illustrated 805.

Figure 9:
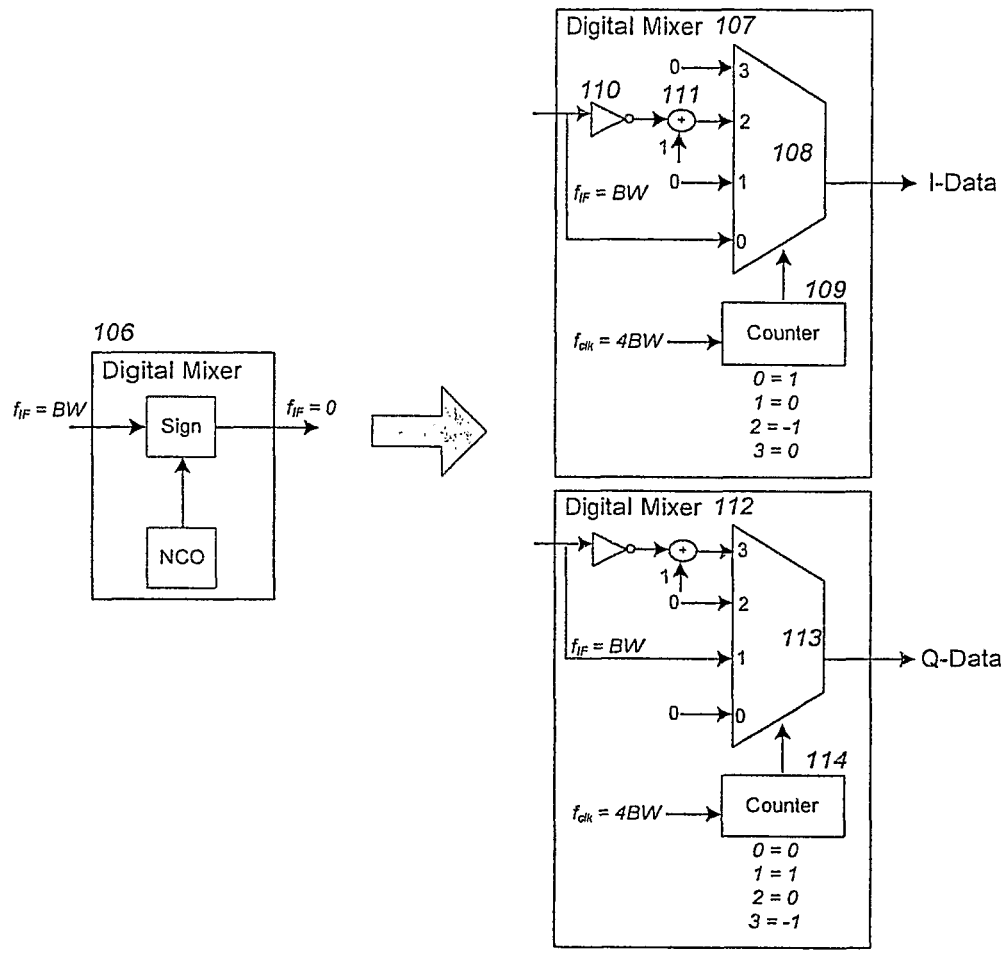
FIG. 9. is an example of the system used for the digital IF sampling/mixing of an embodiment of the present invention.

An example of a digital mixer, implemented as combined sign-modifier and NCO, suitable for use in the architecture of the present invention is illustrated in FIG. 9. The embodiment illustrated in FIG. 9 implements the sign modifier and NCO using a simple 4 input multiplexer and 2 bit counter with operating frequency $f_s=4BW$. A minimum of four discrete samples are required to represent full cosine and sine oscillation digitally i.e. a maximum positive, a minimum positive or zero, a minimum negative and maximum negative or zero. The sign change mechanism uses 2's complement sign inversion performed by inverter 110 and 1-bit addition 111.

The digital IF sampling/mixing and digital interpolator and decimator modules in both digital front end transmitter and receiver software radio must all operate using the same defined sampling frequency. The NCO generates perfect oscillation of 1 s, −1 s and 0 s in periodic manner when the oscillation value is four times of the periodic frequency.

Using the multiplicity of four, the operating sampling frequency can be fixed to 4×bandwidth (4BW) to ensure the IF bandwidth falls outside the baseband.

The digital transmitter and receiver system advantageously employs a single low pass filter to perform both the interpolation and pulse shaping functions for the transmitter and the decimation and pulse shaping functions in the receiver.

In the preferred embodiment the low pass filter 44 51, for interpolation and pulse shaping and decimation and pulse shaping respectively, is a low pass finite impulse response (FIR) filter. A root raised cosine filter is recommended for the low pass finite impulse response (FIR) filter. Root raised cosine filters provide excellent low-pass Nyquist filter response effects.

Figure 10:
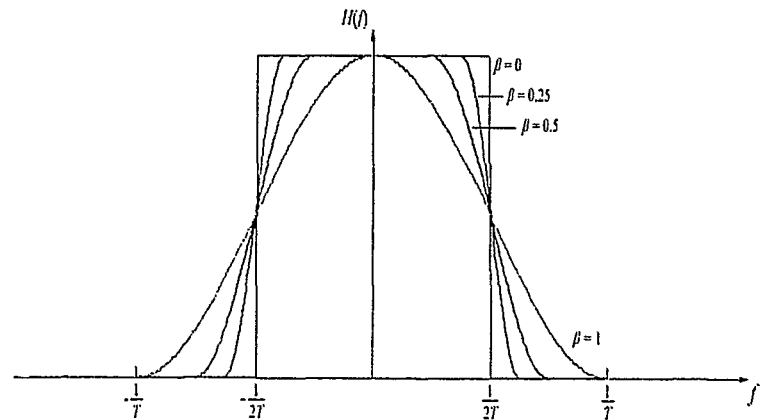
FIG. 10. illustrates the raise root cosine filter response.

An example of a raised cosine filter frequency response is illustrated in FIG. 10. The raised cosine filter provides excellent pulse shaping filtering as the frequency response |H(f)| of a perfect raised cosine filter is symmetric at 0 Hz and is divided into three parts. i.e. it is flat (constant) in the pass-band; it sinks in a graceful cosine curve to zero through the transition region; and it is zero outside the pass-band. β determines the roll-off factor of the filter response. This makes raised-cosine as an ideal filter for this architecture. The impulse response of the normal raised cosine filter is shown in Equation 4. When root raised cosine filter Equation 5, is convolved with itself, the impulse response is equal to the impulse response of normal raised cosine filter.

$$h(t) = \frac{\sin(\pi t/T)}{(\pi t/T)} \cdot \frac{\cos(\pi \beta t/T)}{(1 - 4\beta^2 t^2/T^2)} \quad (4)$$

$$h(t) = 4\beta \frac{\cos((1+\beta)\pi t/T) + \frac{\sin((1-\beta)\pi t/T)}{4\beta \frac{t}{T}}}{\pi\sqrt{T}(1 - 4\beta t/T)^2} \quad (5)$$

This makes root-raised cosine filter an ideal filter for both digital front-end transceiver LPFs of the same system.

Figure 11:
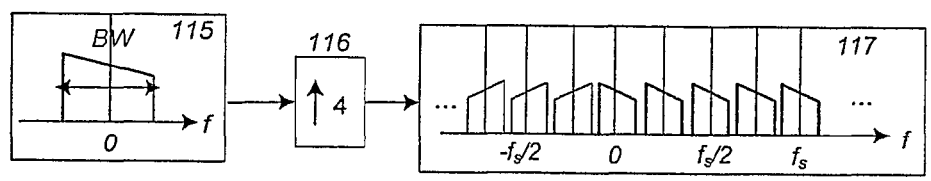
FIG. 11. illustrates the effect of interpolation without low-pass filtering.
Figure 12:
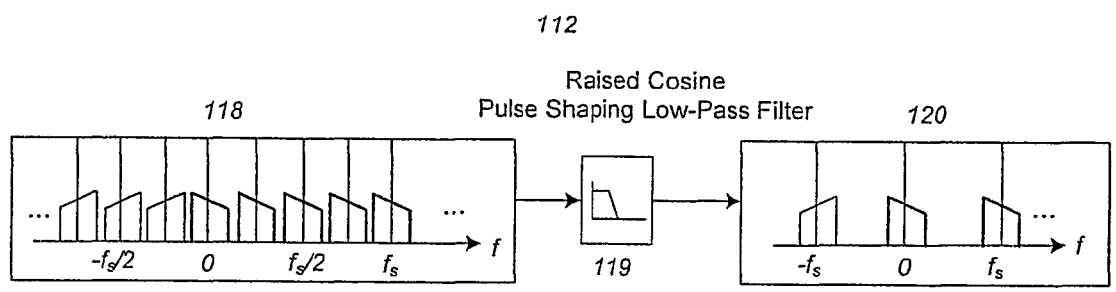
FIG. 12. illustrates the effect of low pass filtering on interpolation.

FIG. 11 illustrates the effect of the interpolation sampling without low-pass filtering. The effect of the sample rate change produces harmonics of equal strength at multiples of original sampling rate. FIG. 12 illustrates the importance of LPF for interpolation process. The root-raised cosine filter response removes the multiple baseband spectrum images from between 0 and $f_s$. The number of filter taps can be fixed to a value that gives excellent frequency response approximating a Nyquist filter response. The LPF also pulse shapes the digital signal for analogue transmission over higher sampling frequencies.

Embodiments of the present invention provide an efficient platform for software defined radio implementation. The sampling rate multiplicity can be fixed to four times of bandwidth and the number of filter coefficient can be fixed to the number of taps to gives excellent frequency response approximating the ideal Nyquist filter response.

An advantage of the present invention is the sampling frequency $f_s$, and the number of filter coefficients for the filters can be easily adjusted through software to suit specific applications. For example, the same system can be used for a narrow band or broadband wireless communication application simply by adjusting the sampling frequency and filter coefficient parameters for the software radio system.

This enables all the digital baseband and digital IF sampling modules architecture to be fixed for any wireless broadband application allowing true software defined radio for any implementation type through programmable hardware or software application. In other words, embodiment of the invention enable many different wireless applications implemented using the same digital front end transceiver software radio system with programmable capability. The architecture can be readily realised in FPGAs or digital signal microprocessors with only minor parameter modifications in RF front-end design of the system.

Embodiments of the present invention offer efficient and low complexity implementation for a digital front end for a software radio system. Embodiments of the invention are suitable for use in software defined radio implementations for broadband digital wireless communication system as the architecture provides fixed multiplicity of sampling rates from baseband to the intermediate frequency (IF).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A digital front end transceiver system for a software radio system comprising:

a transmitter module adapted to digitally interpolate, up-convert and combine baseband digital in-phase (I) and quadrature (Q) channels to form a digital intermediate frequency (IF) IQ signal for conversion to an analogue IF IQ signal for transmission; and a receiver module adapted to separate, down-convert and decimate a received digital IF IQ signal into baseband digital I and Q channels, wherein the transmitter and receiver modules use a common fixed sampling and IF conversion rate $f_s$, where $f_s$ is a quadruple of the bandwidth of the baseband signal, such that the system can be applied in a software radio system for a wireless communication application having any baseband bandwidth by selecting the fixed sampling rate based on the baseband bandwidth, wherein the sampling rate $f_s$=4 BW where BW is the bandwidth of the baseband signal, such that the center frequency $f_{IF}$ of the intermediate frequency signal IF is $f_{IF}$=BW, and wherein the receiver module includes a down-converting digital IF sampler/mixer having a numerically controlled oscillator (NCO) and two sign converters for separating and down-converting from an intermediate frequency to a baseband the a digital IQ signal received from a digital to analogue converter and separating the signal into the respective I and Q signal components, and a decimator having, for each of the I and Q signals, a low pass filter for pulse shaping and decimating and a sampler for down-sampling the I and Q channel signals to reduce the signal bandwidth to that of the a desired digital baseband, wherein the NCO and two sign converters are implemented using two four input multiplexers and a 2 bit counter wherein the sign change mechanism uses 2's complement sign inversion performed by an inverter and one bit adder.

2. The digital front end transceiver system as claimed in claim 1 wherein the down-converting digital mixer/sampler performs down-conversion from baseband to the intermediate frequency by applying a periodic sign changing sequence of 0, 1, 0, −1 representing phases of 0°, 90°, 180° and 270° of a sinusoidal function at a sampling rate of $f_s=4$ BW and sampling with a 90° phase separation to separate the I and Q signal components.

3. The digital front end transceiver system as claimed in claim 1 further comprising an analogue to digital converter (ADC) for converting a received analogue IF IQ signal to a digital IF IQ signal.

4. The digital front end transceiver system as claimed in claim 3 wherein the ADC is adapted to naturally down-convert a received analogue signal having a first intermediate frequency IF1 having a center frequency of $f_{IF1}=f_s+$BW, to a second intermediate frequency IF2 having a center frequency of $f_{IF2}=$BW by using a sampling rate of $f_s$ for the analogue to digital conversion.

5. The digital front end transceiver system as claimed in claim 1 wherein the LPF is a root-raised cosine low-pass filter (LPF) adapted to perform both decimator and pulse-shaping operations.

6. The digital front end transceiver system as claimed in claim 5 wherein the impulse response of the LPF is defined by:

$$h(t) = 4\beta \frac{\cos((1+\beta)\pi t/T) + \frac{\sin((1-\beta)\pi t/T)}{4\beta\frac{t}{T}}}{\pi\sqrt{T}\,(1-4\beta t/T)^2)}$$

where $\beta$ determines the roll off factor of the filter response.

7. A digital front end transceiver system for a software radio system comprising:
a transmitter module adapted to digitally interpolate, up-convert and combine baseband digital in-phase (I) and quadrature (Q) channels to form a digital intermediate frequency (IF) IQ signal for conversion to an analogue IF IQ signal for transmission; and
a receiver module adapted to separate, down-convert and decimate a received digital IF IQ signal into baseband digital I and Q channels,
wherein the transmitter and receiver modules use a common fixed sampling and IF conversion rate $f_s$, where $f_s$ is a quadruple of the bandwidth of the baseband signal, such that the system can be applied in a software radio system for a wireless communication application having any baseband bandwidth by selecting the fixed sampling rate based on the baseband bandwidth,
wherein the sampling rate $f_s=4$ BW where BW is the bandwidth of the baseband signal, such that the center frequency $f_{IF}$ of the intermediate frequency signal IF is $f_{IF}=$BW, and
wherein the transmitter module includes a digital transmitter baseband interpolator having for each of the I and Q channels a digital sampler adapted to sample the digital signals for transmission, and a low pass filter (LPF) for interpolating and pulse shaping the sampled digital signals; and a digital up-converting intermediate frequency sampler/mixer having a numerically controlled oscillator (NCO), two sign converters and a mixer for combining and up-converting to the IF the digital signals for the I and Q channels, and
wherein the NCO and two sign converters are implemented using two four input multiplexers and a 2 bit counter wherein the sign change mechanism uses 2's complement sign inversion performed by an inverter and one bit adder.

* * * * *

UNITED STATES PATENT AND TRADEMARK OFFICE
CERTIFICATE OF CORRECTION

PATENT NO. : 8,532,162 B2
APPLICATION NO. : 12/450953
DATED : September 10, 2013
INVENTOR(S) : Mazlaini Yahya It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 837 days.

Signed and Sealed this
Fifteenth Day of September, 2015

Michelle K. Lee
*Director of the United States Patent and Trademark Office*